Sept. 21, 1926.

C. V. McCARLEY 1,600,682

DEFLECTOR FOR AUTOMOBILE LAMPS

Filed Nov. 5, 1925

Inventor
Clark V. McCarley
By *(signature)*
Attorney

Patented Sept. 21, 1926.

1,600,682

UNITED STATES PATENT OFFICE.

CLARK V. McCARLEY, OF McCLURE, OHIO.

DEFLECTOR FOR AUTOMOBILE LAMPS.

Application filed November 5, 1925. Serial No. 66,892.

My invention has for its object to provide a light deflector for automobile head lights which is so constructed that the rays of light of the lamp to which my invention is applied will be deflected toward the road and substantially all diffused and direct rays will be confined to lines that do not rise above the horizontal and hence the light from the lamp cannot blind the operators of approaching automobiles. I have found that by corrugating the forward part of an interiorly polished vizor, a large number of diffused rays of light are spread over the surface of the road while substantially all of the direct rays from the lamp and the reflector alone project themselves forward along the road. Also by so corrugating the forward portion of the vizor, the cylindrical sheet metal, of which the vizor is formed, may be drawn to form a substantially straight forward edge which is so located as to extend across and substantially through the focal axis of the lamp. The spread of the light over the road is also increased by corrugations formed along the sides of the vizor. The rays of light projected from the lower half of the reflector of the lamp may be diffused by a translucent body. In the preferred form of my invention this portion of the light is diffused by means of a wire mesh filled with a transparent material such as celluloid which increases the proportionate amount of diffused light and this light by reason of the construction of the vizor is directed to the road and spread over a relatively large area.

The invention may be contained in automobile lamp deflectors of different forms. To illustrate a practical application of the invention, I have selected a deflector containing the invention and shall describe it hereinafter. The deflector selected is shown in the accompanying drawing.

Figure 1:
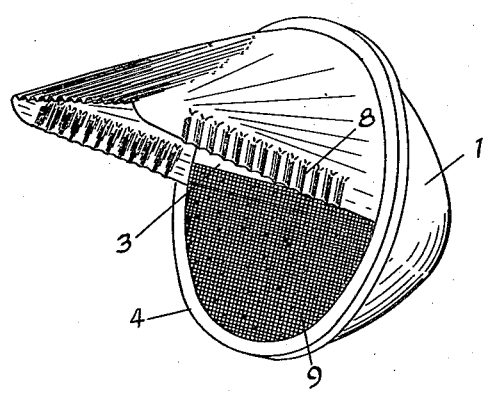
Figure 2:
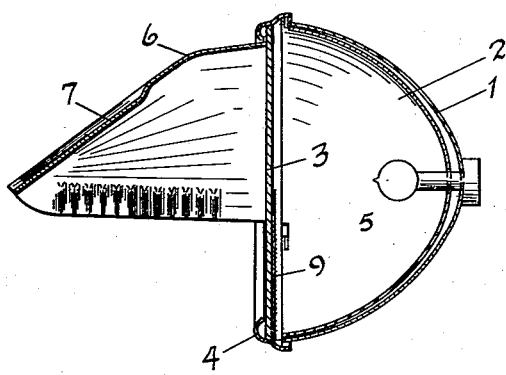
Figure 3:
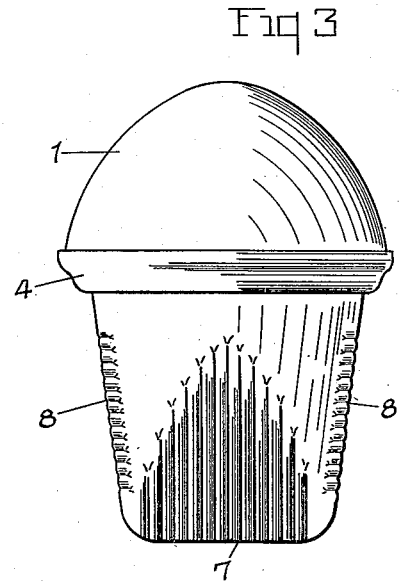
Figure 4:
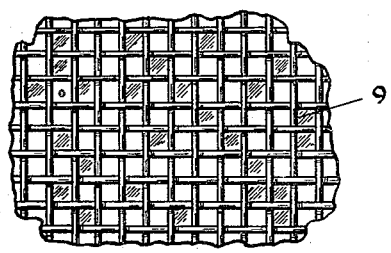

Figure 1 is a perspective view of an automobile lamp to which the deflector is connected. Fig. 2 is a view of a vertical section taken through the focal axis of the lamp. Fig. 3 is a top view of the lamp and the deflector. Fig. 4 is an enlarged view showing the light diffusing means that covers the lower half of the lens of the lamp.

The lamp to which the deflector is connected as shown in the drawings, is of the usual type, it having a shell 1, a reflector member 2, a lens 3 and a clamping ring 4 of the usual type for securing the lens 3 and the reflector 2 in position relative to the shell 1. The bulb 5 is positioned in the focal axis of the reflector 2 and so as to direct forward the rays of light that are produced by the lamp.

A vizor 6 is also secured in position by means of the ring 4. The vizor 6 extends semi-cylindrically around the upper part of the ring 4 and so as to surround the upper side of the focus rays of the lamp. The forward part 7 of the vizor 6 is corrugated to form corrugations, that is, ridges and channels, that extend in the direction of the focal axis of the lamp, and so as to locate the forward edge of the vizor in substantially a straight line extending substantially through and at right angles to the focal axis. The corrugations operate to distribute the light over the road in the vicinity of the front of the automobile. The amount of light that is thus spread or distributed over the road is increased by the substantially vertical corrugations 8 that extend from the said edges of the vizor.

The light that is reflected from the lower half of the reflector 2 is, preferably, diffused by a suitable translucent member located in proximity to the ends of the lamp or by the lower half of the lens being formed of translucent glass. In the form of construction shown the diffusion of this portion of the light is produced by a screen of wire mesh having interstices filled with a transparent material such as celluloid which increases the diffusion of the light while the absorption is slight. The light screen 9 is, preferably, located on the inside of the lens 3 and covers the lower half of the lens. By the diffusion of the light that is produced by the light screen 9, a greater portion of the light will be distributed by the corrugated portions 7 and 8 of the vizor.

Some of the direct rays from the lamp will pass between the upper edge of the light screen 9 and the forward edge of the vizor while practically all of the light that is reflected from the upper half of the reflector 2 will pass forward through the upper half of the lens 3 to a point in advance of the automobile.

By my invention I have thus produced an efficient means for causing uniform distribution of the light in front of the automobile and yet projecting it well in advance to light the road while at the same time the blinding caused by total diffusion and direct rays is eliminated.

I claim:—

In an automobile lamp deflector, a vizor having corrugations extending in the direction of the focal axis of the lamp, and to the forward edge of the vizor and corrugations extending upward from the side edges of the vizor.

In testimony whereof I have hereunto signed my named to this specification.

CLARK V. McCARLEY.